(12) United States Patent
Ballarini et al.

(10) Patent No.: US 7,924,794 B2
(45) Date of Patent: Apr. 12, 2011

(54) METHOD AND SYSTEM FOR CENTRALIZED RADIO RESOURCE ALLOCATION IN COMMUNICATION NETWORKS, RELATED NETWORK AND COMPUTER PROGRAM PRODUCT

(75) Inventors: Enrico Ballarini, Verona (IT); Daniele Tortora, Sesto s. Giovanni (IT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 922 days.

(21) Appl. No.: 11/888,194

(22) Filed: Jul. 31, 2007

(65) Prior Publication Data
US 2008/0069042 A1    Mar. 20, 2008

(30) Foreign Application Priority Data

Aug. 1, 2006  (EP) .................................... 06425552
Jul. 19, 2007  (WO) ................ PCT/EP2007/006434

(51) Int. Cl.
*H04W 4/00* (2009.01)
(52) U.S. Cl. ....................................................... 370/338
(58) Field of Classification Search ........................ None
See application file for complete search history.

(56) References Cited

U.S. PATENT DOCUMENTS

| 7,630,356 B2* | 12/2009 | Zhang et al. | 370/344 |
| 2002/0082021 A1* | 6/2002 | Chen et al. | 455/450 |
| 2004/0127223 A1* | 7/2004 | Li et al. | 455/446 |
| 2005/0111429 A1* | 5/2005 | Kim et al. | 370/344 |

(Continued)

FOREIGN PATENT DOCUMENTS

| EP | 0 622 925 A1 | 11/1994 |
| EP | 1 389 856 A1 | 2/2004 |

OTHER PUBLICATIONS

Guoqing Li et al, "Downlink dynamic resource allocation for multi-cell OFDMA system", Vehicular Technology Conference, 2003, VTC 2003-Fall. 2003 IEEE 58th Orlando, FL USA Oct. 6-9, 2003 Piscataway, NJ, USA, pp. 1698-1702, XP010701466, ISBN 0-7803-7954-3.

(Continued)

*Primary Examiner* — Chirag G Shah
*Assistant Examiner* — Amarnauth Persaud
(74) *Attorney, Agent, or Firm* — Laurence A. Greenberg; Werner H. Stemer; Ralph E. Locher

(57) ABSTRACT

A method for centralized radio resource allocation in a communication network including a Network Control and Management System and at least one Base Station Cluster having a set of Base Station Entities to which respective permutation zones and radio resources are to be allocated. The Network Control and Management System controls the allocation of permutation zones and radio resources to the Base Station Entities by aligning the permutation zones of different Base Station Entities and by determining the radio resources to be used within each permutation zone. Preferably, the Network Control and Management System issues towards the Base Station Entities a first message requesting information on the radio resources available including specific information items for each permutation zone. The Base Station Entities return towards the Network Control and Management System a second message including the information requested in said first message, and the Network Control and Management System issues towards the Base Station Entities a third message including commands to align the permutation zones of different Base Station Entities to determine the radio resources to be used within each permutation zone.

20 Claims, 5 Drawing Sheets

U.S. PATENT DOCUMENTS

| | | | |
|---|---|---|---|
| 2005/0288027 A1* | 12/2005 | Cho et al. | 455/442 |
| 2006/0007849 A1* | 1/2006 | Kim et al. | 370/208 |
| 2006/0153227 A1* | 7/2006 | Hwang et al. | 370/465 |
| 2009/0109910 A1* | 4/2009 | Kim et al. | 370/329 |

OTHER PUBLICATIONS

IEEE-SA Standards Board, "Air Interface for Fixed and Mobile Broadband Access Systems—Management Plane Procedures and Services", Draft Amendment to IEEE Standard for Local and Metropolitan Area Networks, IEEE P802.16G, Jun. 2006, pp. i and 116-123, XP002418165.

WiMAX Forum, "WiMAX End-to-End Network Systems Architecture (Stage 3: Detailed Protocols and Procedures)", Aug. 8, 2006, pp. i-iii and 156-162, XP 002418166.

IEEE 802.16G-06/052R1 Broadband Wireless Access Working Group, "Management of Radio Resources Assigned to Neighboring BSSs", Sep. 26, 2006, XP002418167.

\* cited by examiner

METHOD AND SYSTEM FOR CENTRALIZED RADIO RESOURCE ALLOCATION IN COMMUNICATION NETWORKS, RELATED NETWORK AND COMPUTER PROGRAM PRODUCT

CROSS REFERENCE TO RELATED APPLICATIONS

This application claims priority of European application No. 06425552.4 EP filed Aug. 1, 2006 and claims priority of International Application No. PCT/EP2007/006434, filed Jul. 19, 2007, both of the applications are incorporated by reference herein in their entirety.

FIELD OF INVENTION

The present invention relates to communication networks.

BACKGROUND OF INVENTION

The invention was developed with specific attention paid to its possible use in Mobile Wireless Broadband Access networks conforming to IEEE std 802.16-2004 as amended by IEEE 802.16e-2005 and IEEE 802.16g.

The current reference texts for the standards mentioned in the foregoing are the following:

- IEEE Computer Society and IEEE Microwave Theory and Techniques Society, "IEEE Standard for Local and Metropolitan Area Networks Part 16: Air Interface for Fixed Broadband Wireless Access Systems", IEEE Std 802.16-2004 (Revision of IEEE Std 802.16-2001), 1 Oct. 2004;
- IEEE Computer Society and IEEE Microwave Theory and Techniques Society, "IEEE Standard for Local and Metropolitan Area Networks Part 16: Air Interface for Fixed Broadband Wireless Access Systems" Amendment 2: Physical and Medium Access Control Layers for Combined Fixed and Mobile Operation in Licensed Bands and Corrigendum 1, 28 Feb. 2006; and
- IEEE Computer Society and IEEE Microwave Theory and Techniques Society, "Draft IEEE Standard for Local and Metropolitan Area Networks Part 16: Air Interface for Fixed and Mobile Broadband Wireless Access Systems—Management Plane Procedures and Services", IEEE P82.16g/D2, 3 Apr. 2006.

Further exemplary of networks to which the invention may apply are Mobile WiMAX networks, based on the IEEE 802.16 specifications.

The current reference texts for the Mobile WIMAX networks are the following:

- WiMAX Forum, "WiMAX End-to-End Network Systems Architecture (Stage 2: Architecture Tenets, Reference Model and Reference Points)", 1 Mar. 2006, draft;
- WiMAX Forum, "WiMAX End-to-End Network Systems Architecture (Stage 3: Detailed Protocols and Procedures)", 24 Apr. 2006, draft;

WiMAX Forum specifications, based on IEEE 802.16 specifications, assign to Radio Resource Management (RRM) the tasks of measurement, exchange, and control of radio resource-related indicators (e.g., current subchannel allocations to service flows) in the wireless network. RRM related signaling is realized by means of two functional entities within RRM: the Radio Resource Control (RRC) functional entity and Radio Resource Agent (RRA) functional entity.

As expressly indicated by the WiMAX Stage 2 specification, the control function primarily refers to decisions made by a measuring station or remote entity to adjust (i.e., allocate, reallocate or deallocate) radio resources based on the reported measurements and other information, or by using proprietary algorithms, and communicating such adjustments to network entities using standardized primitives. Such control may be local and remote from the measuring station.

Although the RRM definition provided above does include control functions to manage radio resources, no specific messages are supported at the current specification stage to realize these functions. WiMAX forum architecture specifications define the network elements where Access Service Network (ASN) functions are located. Three possible options are currently supported for Mobile WiMAX System Architecture: ASN Profile A, ASN Profile B, ASN Profile C. When ASN Profile A is adopted RRC function has to be located in the network element named Access Service Network Gateway (ASN-GW). ASN-GW controls a set of 802.16 BS Entities in the ASN. A 802.16 BS Entity represents one sector with one frequency assignment. A set of co-located BS Entities is named BS cluster.

At the present stage no means exist in ASN Profile A to control the assignment of Radio Resources in the 802.16 BS Entity, since no RRM messages are currently defined for this purpose. As a consequence, Co-Channel Interference (CCI), Mobile-to-mobile and BS-to-BS interference within a given Base Station (BS) Cluster and among different BS Clusters cannot be avoided.

Similarly, though the IEEE 802.16g specification, which is the baseline for Mobile WiMAX System Architecture, describes Radio Resource Management primitives between NCMS (Network Control and Management System) and the 802.16 BS Entity, the current version of the system specification, that is IEEE 802.16g/D2 (April 2006), does not contain any primitive to avoid the CCI, BS-to-BS and mobile-to-mobile interference problem.

SUMMARY OF INVENTION

An object of the invention is thus to provide a fully satisfactory response to the needs outlined in the foregoing, and particularly of avoiding Co-Channel Interference (CCI), BS-to-BS and mobile-to-mobile interference.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein introduces a modified C-RRM-REQ(Spare Capacity Report, Report type=3) message to specify a new type of required information; this feature allows using a new C-RRM-RSP(Spare Capacity Report) containing novel information regarding, not only the total average amount of available radio resources, but also a specific information item for each permutation zone. Thanks to this increased level of details, the RRC within the NCMS can run a procedure to align permutation zones and allocate sub channels to 802.16 BS Entity in such a way to control and in case eliminate CCI, BS-to-BS and mobile-to-mobile interference within a BS Cluster and among different BS Clusters.

In the preferred embodiment of the arrangement described herein, a subsequent new C-RRM-NOTFY(Neighbor-BS Permutation Zones Status Update) message will enable the RRC to impose on RRAs within different 802-16 BS Entities a proper allocation of Radio Resources which takes into account the current situation of Radio Resource utilization within the BS Cluster and among different BS sites.

The arrangement described herein effectively solves the problem of intra BS Cluster CCI among different 802.16 BS Entities within a BS Cluster and the mobile-to-mobile and BS-to-BS interference problems among different BS sites of a Mobile Wireless Broadband Access network conforming to IEEE std 802.16-2004 as amended by IEEE 802.16e-2005 and IEEE 802.16g. As a particular application, the arrangement described herein is invention solves the problem of intra BS Cluster CCI in a Mobile WiMAX network. Moreover, the arrangement described herein invention allows 802.16 BS Entities to transmit data over radio resources with no intra BS Cluster CCI at all or introducing a controlled level of CCI.

As indicated, practical implementation of the arrangement described herein may involve certain modifications to the IEEE 802.16g/D2 specification to enable RRC Entity in NCMS to control allocation of radio resources in 802.16 BS Entity to avoid the occurrence of CCI problem among BS Entities within a BS Cluster, and the mobile-to-mobile and BS-to-BS interference problems among different BS sites.

BRIEF DESCRIPTION OF THE DRAWINGS

The invention will now be described, by way of example only, with reference to the enclosed figures, in which.

DETAILED DESCRIPTION OF INVENTION

Figure 1:
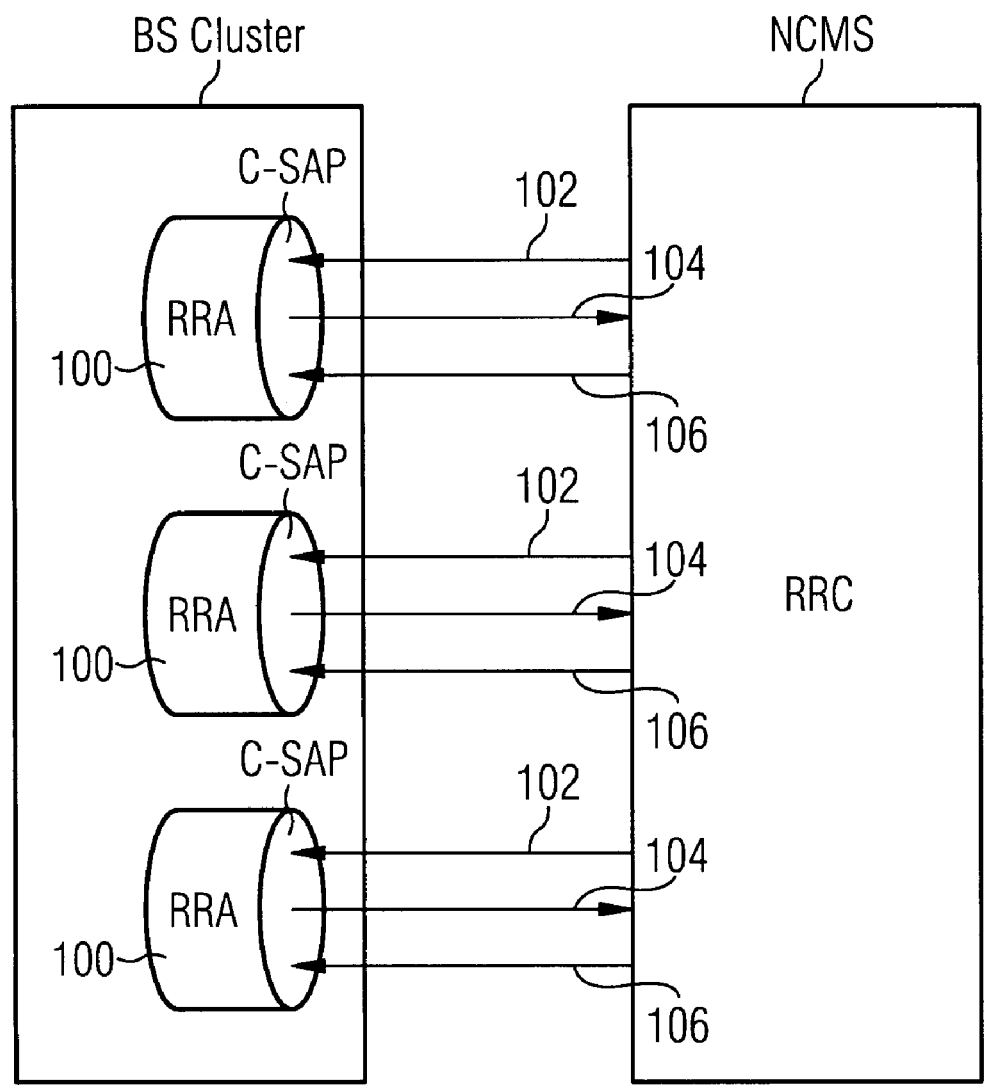
FIG. 1 shows an exemplary BS Cluster made by three co-located 802.16 BS Entities sharing the same frequency band.

As indicated, a preferred field of application of the arrangement described herein are communication networks complying with the IEEE 802.16g standard or the WiMAX Forum specifications. The general layout and arrangement of such networks are well know to the person of skill in the related art, thus making it necessary to provide a detailed description herein. The following will thus primarily adopt terminology from the IEEE 802.16g standard, with the proviso that the same concepts will identically apply also to networks complying with the WiMAX Forum specifications (i.e. Stage 2 and Stage 3 specifications).

The diagram of the drawing illustrates co-operation between the a Base Station Cluster (BS Cluster, left-hand side) and the Network Control and Management System (NCMS, right-hand side) in such a network.

In the arrangement described herein, the NCMS is able to control the allocation of Permutation Zones and Radio Resources within a BS Cluster. In accordance to WiMAX Forum Stage 1 specification, a BS Cluster is defined here as a collection of BS Entities that are physically co-located and can share functional components (i.e. a physical BS site).

Networks such as WiMAX networks support frequency reuse, i.e. all cells/sectors operate on the same frequency channel to maximize spectral efficiency. Users can operate on subchannels, which only occupy a small fraction of the whole channel bandwidth.

Flexible sub-channel reuse is facilitated by sub-channel segmentation and permutation zone. A segment is a subdivision of the available OFDMA sub-channels (one segment may include all sub-channels). One segment is used for deploying a single instance of MAC.

A permutation zone is a number of contiguous OFDMA symbols in DL or UL that use the same permutation. The DL or UL sub-frame may contain more than one permutation zone.

If permutation zones of different 802.16 BS Entities of one or more BS Clusters are aligned and within each zone different sub channels are used, CCI and mobile-to-mobile and BS-to-BS interference can be completely eliminated.

Permutation zones "alignment" is achieved (i.e. the permutation zones are aligned) when all the BS Entities of said BS Clusters are synchronized in time and frequency, which means that the starting time of each permutation zone is the same for all the BS Entities of all the BS Clusters controlled by the aforementioned RRC entity within NCMS.

In the arrangement described herein, when a set of sub channels is used by a 802.16 BS Entity, the NCMS will issue towards the other 802.16 BS Entities of the same BS Cluster command signals not to use the specified set of sub channels to avoid CCI or to transmit if a controlled level of CCI is tolerable: this type of dynamic channel allocation techniques are usually referred to in the literature as "Channel Borrowing" methods.

The IEEE 802.16g/D2 specification offers a set of RRM (Radio Resource Management) primitives for radio resource measurements and reporting procedures between BS and NCMS.

The diagram of the drawing shows message flows between a NCMS (RRC module) and three 802.16 BS Entities 100 within a controlled BS Cluster. Each entity 100 will be generally regarded as including a Radio Resource Agent (RRA) having associated a Core Service Access Point (C-SAP) interface.

In general terms, the "dialogue" between each BS entity 100 and the NCMS will be comprised of three RRM messages for spare capacity reporting and notification management, namely:

a request message 102, i.e. C-RRM-REQ (Spare Capacity Report, Report type=3) from the NCSM to the entity 100;

a response message 104, i.e. C-RRM-RSP (Spare Capacity Report) from the entity 100 to the NCSM; and a notification message 106, i.e. C-RRM-NOTFY (Neighbor-BS Permutation Zones Status Update) from the NCSM to the entity 100.

Implementing the arrangement described herein thus entails modifying these messages to let the NCMS become aware of the detailed radio resource spare capacity information and commanding the 802.16 BS Entities the radio resources they can use within each permutation zone, in order to avoid the CCI problem. Furthermore, to avoid the occurrence of mobile-to-mobile and BS-to-BS interference, RRC can send the same notification message 106 to BS Entities of different BS Clusters.

Specifically, in the message 102 the NCMS will send a C-RRM-REQ(Operation Type=Action, Action_Type=Spare Capacity Report) primitive to all the 802.16 BS Entities 100 within the BS Cluster.

In the current specification version, this primitive is used to request the BS send spare capacity information periodically or event driven.

The current format of C-RRM-REQ is as follows:

```
C-RRM-REQ
  (
    Message_id,
    Operation_Type(Action),
    Action_Type(Spare Capacity Report),
    Object_id(BS_ID or NCMS node),
    Attribute_List:
    Spare Capacity Report Type,
    Report Characteristics,
  )
```

Report Characteristics indicates whether the report should be sent periodically, or be event driven. The arrangement described herein preferably uses periodical reports.

At present, stage Spare Capacity Report Type>2 are reserved for future types. As shown, Spare Capacity Report Type=3 is introduced herein for requiring a new type of Spare Capacity Report.

When a 802.16 BS Entity receives the C-RRM-REQ(Operation Type=Action, Action_Type=Spare Capacity Report, Spare Capacity Report type=3) request 102, it shall send periodically the C-RRM-RSP response message 104 as indicated below (italics font indicates the attributes modified with respect to the present version of the standard):

```
C-RRM-RSP
  (
    Message_id,
    Operation_Type(Action),
    Action_Type(Permutation Zones Spare Capacity Report),
    Object_id(BS_ID or NCMS node),
    Attribute_List:
    for (i = 1; i <= n; i++) {       // For each DL and UL Permutation Zone 1 to n
      OFDMA symbol offset,
      Permutation,
      Available Permutation Zone Radio Resource,
      Permutation Zone Radio Resource Fluctuation
    }
  )
```

The new message attributes are described below.
OFDMA Symbol Offset
Denotes the start of the zone (counting from the frame preamble and starting from 0)
Permutation
Denotes permutation scheme used in current permutation zone. The following types are possible:
DL PUSC permutation;
DL FUSC permutation;
DL Optional FUSC permutation;
DL AMC;
DL TUSC1;
DL TUSC2;
UL PUSC;
UL AMC.
Available Permutation Zone Radio Resources
Percentage of reported average available sub channels and symbols resources per permutation zone
Permutation Zone Radio Resource Fluctuation
Radio Resource Fluctuation is used to indicate the degree of fluctuation of DL data traffic throughput for current Permutation Zone.

On the basis of C-RRM-RSP messages 104 collected from the 802.16 BS Entities 100 of the BS Cluster, the NCMS can decide, i.a.:
  permutation zone sizes; and
  radio resources within the specific permutation zone to be used by each 802.16 BS Entity (e.g. over which subchannels it can transmit).

The NCMS shall enforce its decision (e.g. a change in the two previous assignments) through the new message 106, i.e. C-RRM-NOTFY(Event_Type=Neighbor-BS Permutation Zones Radio Resource Status Update) sent to all the 802.16 BS Entities 100 within the BS Cluster. The structure of the C-RRM-NOTFY(Event_Type=Neighbor-BS Permutation Zones Status Update) message 106 is shown below (again, italics font indicates the attributes that were modified).

```
C-RRM-NOTFY
(
  Message_id,
  Event_Type(Neighbor-BS Permutation Zones Status Update),
  Object_id(BS ID or NCMS node),
  Attribute_List:
  N_NEIGHBORS,
  BS List:
  BS_ID,
  for(i=1;i<=n;i++) {      //For each DL and UL Permutation Zone 1 to n
    OFDMA symbol offset,
    Permutation,
    Available Permutation Zone Radio Resource,
    Permutation Zone Radio Resource Fluctuation,
    Permutation Zone Subchannels Bitmap
  }
  DCD Configuration Change Count,
  UCD Configuration Change Count,
)
```

In the exemplary embodiment illustrated in the annexed drawing the RRC module is located in the NCMS, while a RRA is provided for each of the three 802.16 BS Entities 100 within the controlled BS Cluster.

While not strictly mandatory, such an arrangement of parts is advantageous as it "streamlines" the procedure described above, i.e.:
  at first the NCMS will send C-RRM-REQ(Spare Capacity Report, Report type=3) messages 102 to all the 802.16 BS Entities 100, asking for a periodical C-RRM-RSP (Spare Capacity Report) transmission;
  at periodical time intervals all the 802.16 BS Entities 100 will send back to NCMS the required C-RRM-RSP (Spare Capacity Report) messages 104, indicating the available radio resources, in terms of percentage of reported average available sub channels and symbols resources per permutation zone, for each DL and UL permutation zone;
  when the NCMS has received these responses, it will have available all the required radio resources information, to evaluate (based on a procedure known per se) a proper size for each permutation zone and a proper number of sub channels for each permutation zone of each 802.16 BS Entity; and finally, the NCMS will send its decision to each 802.16 BS Entity 100 by conveying it over the C-RRM-NOTFY (Neighbor-BS Permutation Zones Status Update) messages 106 that contain the DL and UL frame division in permutation zones and the specific sub channels available for the transmission in the BS Entity.

The following is a more detailed description of a currently preferred embodiment of the RRC procedure referred to in the foregoing. As an example, the case will be considered of a BS Cluster made by three co-located 802.16 BS Entities 100 sharing the same frequency band, as illustrated in FIG. 1.

Figure 2:
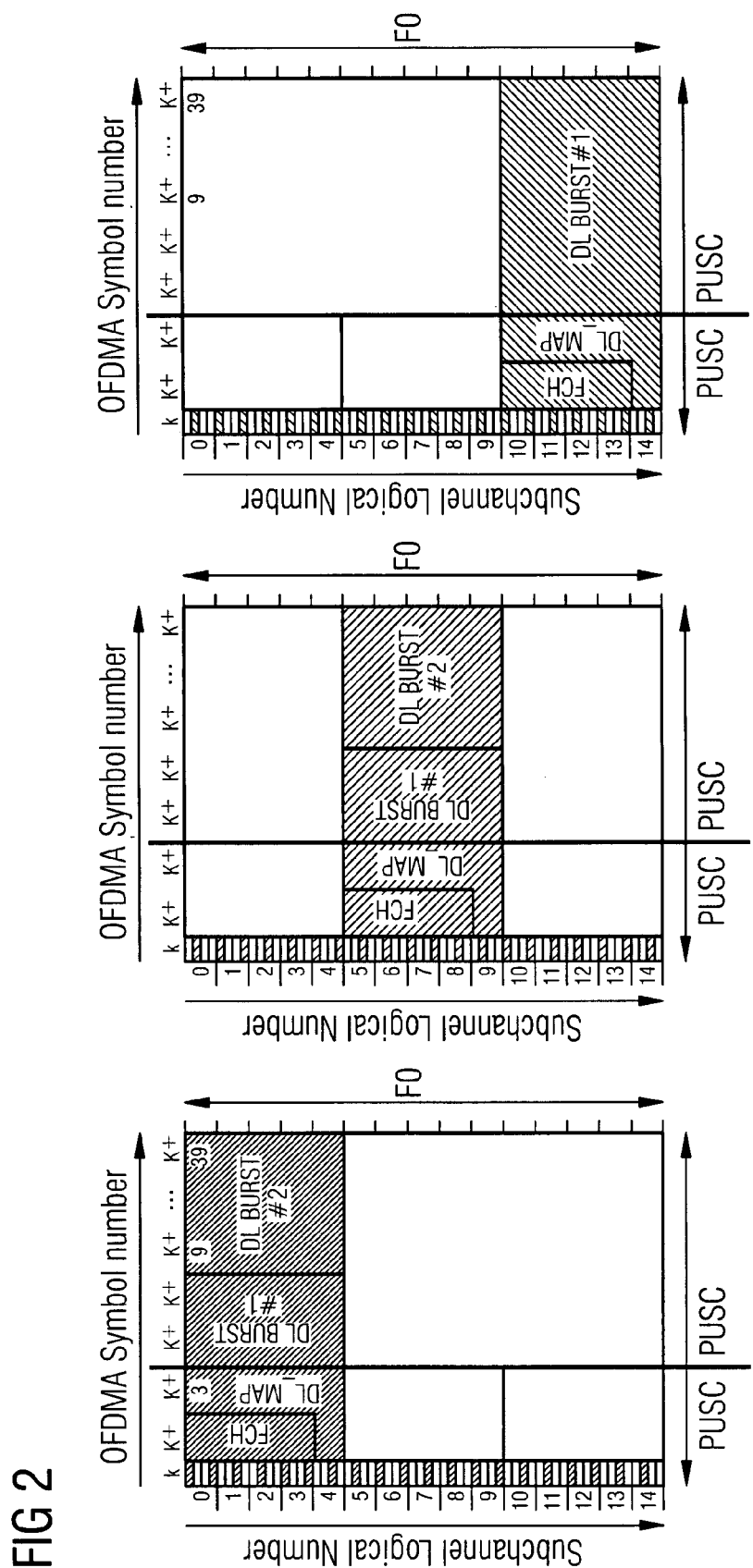
FIG. 2 shows an exemplary permutation scheme for all remaining DL frame period.

The first DL zone will be assumed to start with the PUSC permutation scheme to transmit FCH and DL-MAP. In order to avoid the CCI problem, one might envisage to keep the same permutation scheme for all the remaining DL frame period (see FIG. 2), which would be a way to have a segment reuse 3 (i.e. frequency reuse 3) in the BS Cluster considered: graphically, different sub channels are used by the three 802.16 BS Entities.

When the traffic load of a single 802.16 BS Entity 100 increases, for instance when a higher number of connections has to be served, the bandwidth allocated to a particular BS Entity 100 is increased in number of sub channels and this is only possible employing a different permutation scheme (e.g. PUSC w/all sub channels, FUSC, AMC, etc.).

Figure 3:
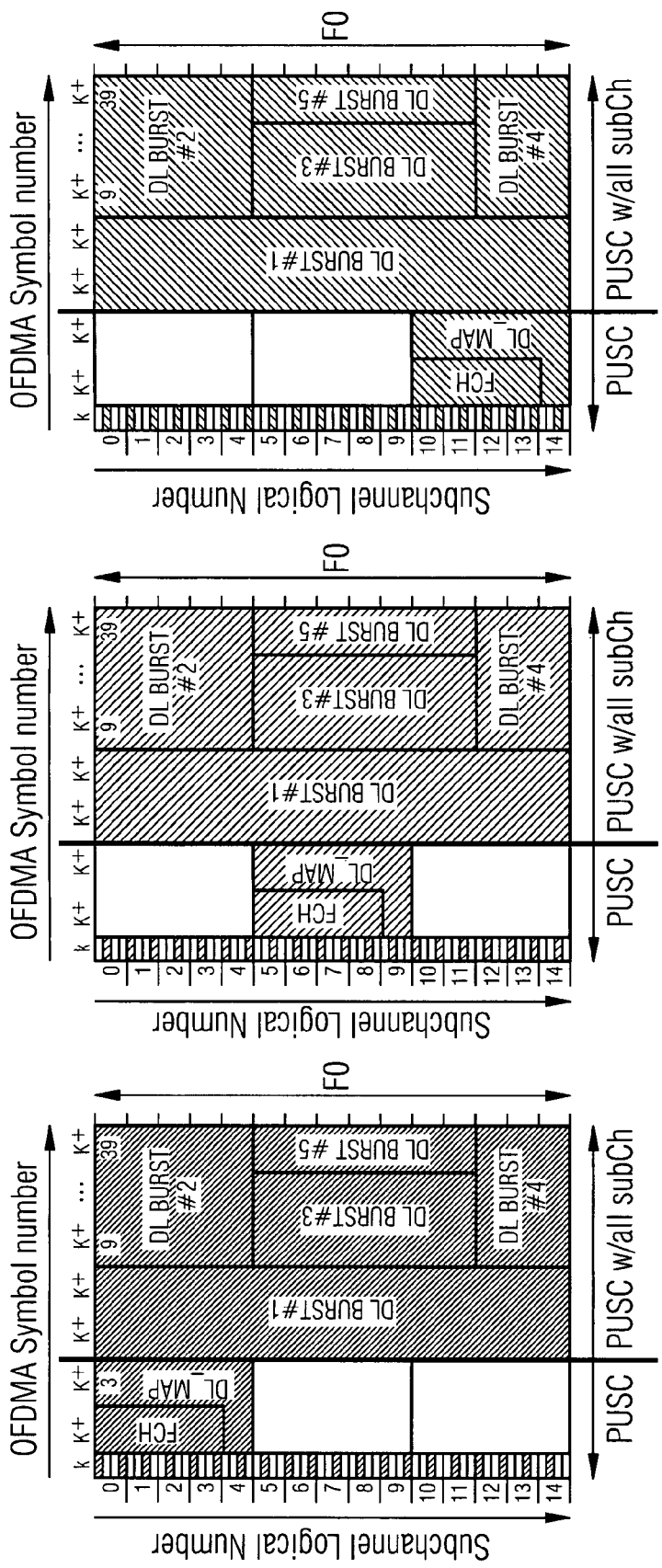
FIG. 3 shows an exemplary permutation scheme adopted to allow all the 802.16 BS Entities to transmit over the full set of sub-channels.

Suppose then that within the BS Cluster a second DL permutation zone is employed (e.g. PUSC w/all sub channels) in order to increase the available bandwidth of a particular 802.16 BS Entity 100 that has to serve a larger cell with more active connections. The permutation scheme adopted allows all the 802.16 BS Entities 100 to transmit over the full set of sub channels, as graphically shown in FIG. 3, which is representative of DL frame in PUSC and PUSC w/all sub channels mode without RRC coordination.

The permutation scheme adopted thus reduces the frequency reuse factor from 3 to 1, since they all use the same sub channels and one obvious effect is the introduction of interference among the three 802.16 BS Entities (e.g. at the cell borders).

It will thus be appreciated that the arrangement described dispenses with the CCI problem related to the the need for more bandwidth in one cell. The modifications introduced in the messages between the 802.16 BS Entities 100 and the NCMS make it now possible to coordinate the starting symbol offset of each permutation zone and moreover to assign a different subset of sub channels to each 802.16 BS Entity 100. The number of sub channels within each subset is dynamically evaluated by the RRC module and can be defined set in a joined manner considering the traffic load in each cell.

Figure 4:
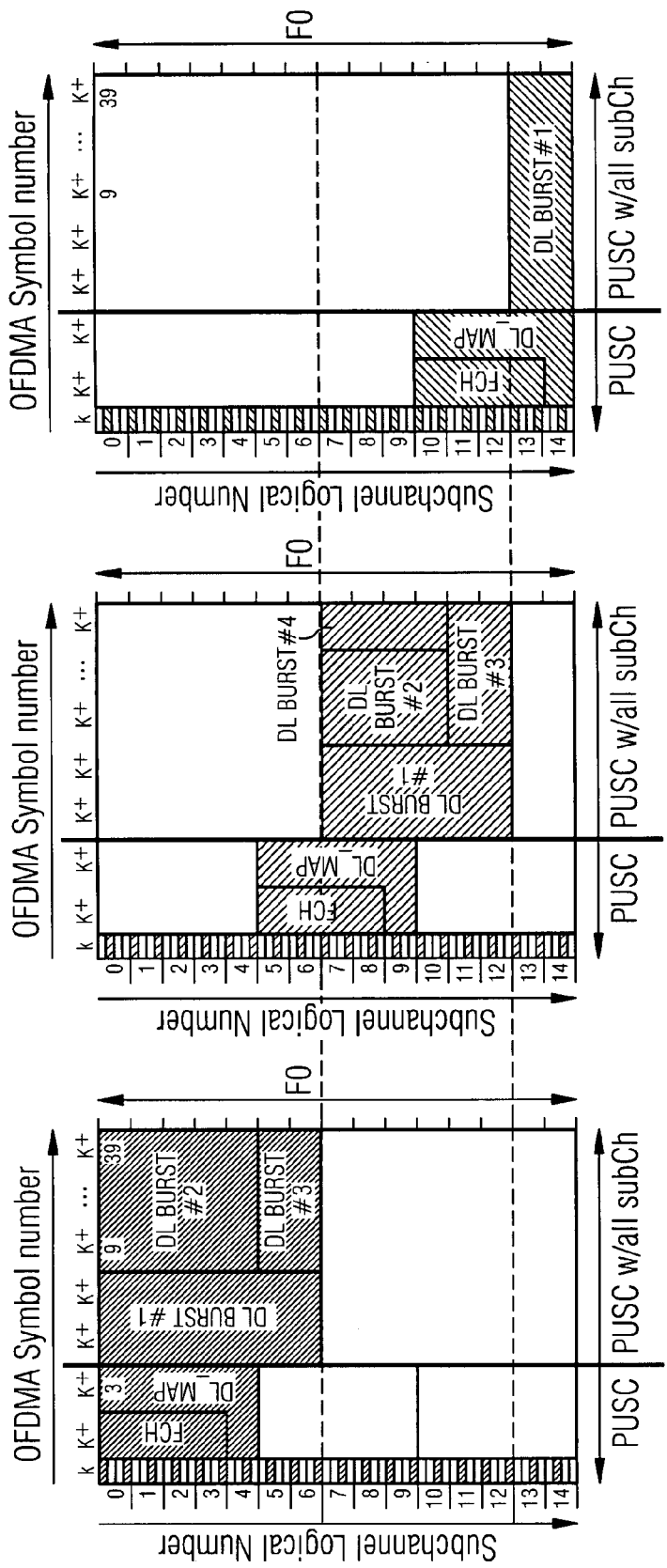
FIG. 4 shows an example of dynamic allocation of sub-channels with DL frame in PUSC and PUSC w/all sub-channels mode with RRC coordination and no CCI.

FIG. 4 shows an example of dynamic allocation of sub channels with DL frame in PUSC and PUSC w/all sub channels mode with RRC coordination and no CCI. Specifically, FIG. 4 refers to a case where a first 802.16 BS Entity 100 needs two more sub channels to accommodate new connections, while a second BS Entity 100 needs only additional sub channel and the third BS Entity has a lower traffic load and can be assigned two sub channels only.

By means of the modified RRM messages introduced in the arrangement described herein, the NCMS can centrally assign radio resources indicating the set of sub channels to be used by each BS Entity, avoiding the CCI problem occurrence.

Figure 5:
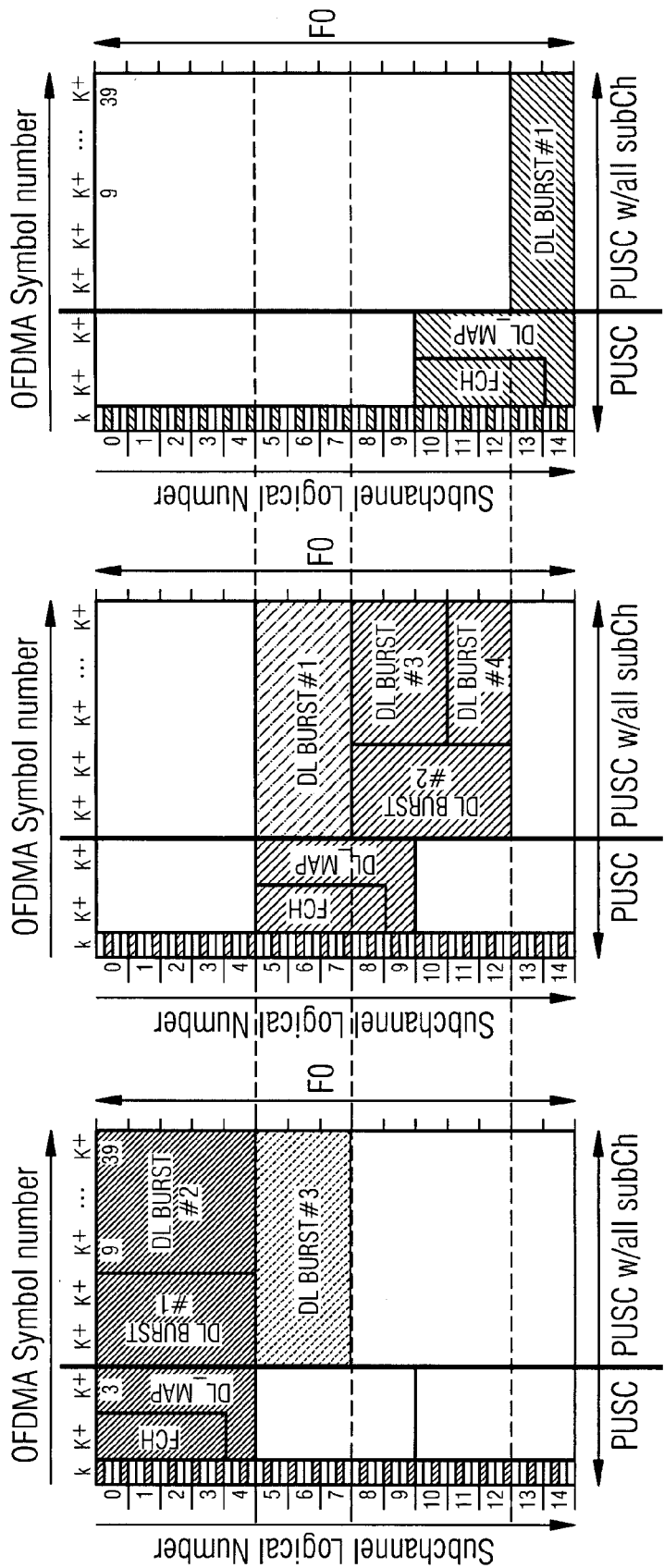
FIG. 5 shows exemplary diagrams representative of a DL frame in PUSC and PUSC w/all sub channels mode with RRC coordination with a controlled level of CCI.

The arrangement described herein makes it possible to design a RRC algorithm that dynamically assigns radio resources basing its decision on cell traffic load conditions. Furthermore, the arrangement described herein makes it possible to tolerate a controlled level of CCI by assigning to different 802.16 BS Entities 100 a common subset of sub channels: see for instance the diagrams of FIG. 5, that are representative of a DL frame in PUSC and PUSC w/all sub channels mode with RRC coordination with a controlled level of CCI.

The example considered shows a set of sub channels shared by the first and second 802.16 BS Entities. The modified messages introduced by the arrangement described herein enable each BS Entity 100 to become aware of the sub channels allocated to other BS Entities 100 within the same BS Cluster. Consequently, all the BS Entities 100 may identify those sub channels that are totally CCI free and those sub channels that can potentially accept a controlled level of CCI.

Those of skill in the art will promptly appreciate that the arrangement described herein can be easily extended e.g. to a plurality of BS Clusters controlled by an ASN-GW. Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method for centralized radio resource allocation in a communication network, comprising:
    providing a Network Control and Management System;
    providing a Base Station Cluster with a set of Base Station Entities, wherein permutation zones and radio resources are allocated to the Base Station Entities, a Permutation Zone is a number of contiguous Orthogonal Frequency-Division Multiple Access (OFDMA) symbols in a downlink or uplink that use the same permutation or mapping sequence between sub-channels and sub-carriers, the permutation zones are aligned when all the base station entities of all Base Station clusters are synchronized in time and frequency so that a starting time of each permutation zone is the same for all Base Station (BS) entities of all the base station clusters controlled by a Radio Resource Control (RRC) entity within the network control and management system; and
    controlling the allocation of permutation zones and radio resources to the Base Station Entities by
    aligning the permutation zones and radio resources of different Base Station Entities in the Base Station Cluster wherein aligning the permutation zones reduces Co-Channel Interference and mobile-to-mobile interference, by
    determining the radio resources to be used within each permutation zone by the Base Station Entities,
    wherein the Network Control and Management System issues towards the Base Station Entities a first message requesting information on the radio resources available, including specific information items for each permutation zone,
    wherein the Base Station Entities return towards the Network Control and Management System a second message including the information requested in the first message.

2. The method as claimed in claim 1, wherein the Network Control and Management System controls the allocation of permutation zones and radio resources to the Base Station Entities.

3. The method as claimed in claim 2, wherein the radio resources to be allocated have radio sub channels, and wherein the controlling of the allocation of radio resources to the Base Station Entities includes allocating different sub channels within each permutation zone.

4. The method as claimed in claim 3, wherein Co-Channel Interference is eliminated based upon the allocation of different sub channels within each permutation zone.

5. The method as claimed in claim 4, further comprising detecting the use of a given set of sub channels by one of the Base Station Entities.

6. The method of claim 5, further comprising issuing towards Base Station Entities in the Base Station Cluster command signals not to use the given set of sub channels to avoid Co-Channel Interference.

7. The method as claimed in claim 1,
wherein the radio resources to be allocated include radio sub channels,
wherein the Network Control and Management System detects the use of a given set of sub channels by one of the Base Station Entities; and
wherein the Network Control and Management System issues towards other Base Station Entities in said Base Station Cluster by transmitting over the given set of sub channels a specified set of sub channels with a level maintaining a controlled level of Co-Channel Interference.

8. The method as claimed in claim 1,
wherein the Network Control and Management System issues towards the Base Station Entities a third message including commands to align the permutation zones of different Base Station Entities in the Base Station Cluster and determines the radio resources to be used within each permutation zone by the Base Station Entities in the Base Station Cluster.

9. The method as claimed in claim 8, wherein the Base Station Entities returns the second message towards the Network Control and Management System on a periodic basis.

10. A Network Control and Management System for centralized radio resource allocation in a communication network, comprising:
a Base Station Cluster, wherein the Base Station Cluster has Base Station Entities,
wherein permutation zones and radio resources are allocated to the Base Station Entities, a Permutation Zone is a number of contiguous Orthogonal Frequency-Division Multiple Access (OFDMA) symbols in a downlink or uplink that use the same permutation or mapping sequence between sub-channels and sub-carriers, the permutation zones are aligned when all the base station entities of all Base Station clusters are synchronized in time and frequency so that a starting time of each permutation zone is the same for all Base Station (BS) entities of all the base station clusters controlled by a Radio Resource Control (RRC) entity within the network control and management system,
wherein the Network Control and Management System controls the allocation of the permutation zones and the radio resources to the Base Station Entities in the Base Station Cluster by aligning the permutation zones of different Base Station Entities in Base Station Cluster and by determining the radio resources to be used within each permutation zone by the Base Station Entities in the Base Station Cluster, wherein aligning the permutation zones reduces Co-Channel Interference and mobile-to-mobile interference, and
wherein the Network Control and Management System:
issues towards the Base Station Entities a first message requesting information on the radio resources available, including specific information items for each permutation zone, and
receives a second message returned from the Base Station Entities, including the information requested in the first message.

11. The Network Control and Management System as claimed in claim 10, wherein the allocated radio resources have radio sub channels.

12. The Network Control and Management System as claimed in claim 11, wherein the Network Control and Management System controls the allocation of the radio resources to the Base Station Entities based upon allocating different sub channels within each permutation zone.

13. The Network Control and Management System as claimed in claim 12, wherein the Network Control and Management System detects a use of a given set of sub channels by one of the Base Station Entities.

14. The Network Control and Management System as claimed in claim 11, wherein the Network Control and Management issues towards other Base Station Entities in the Base Station Cluster command signals not to use a specified set of sub channels.

15. The Network Control and Management System as claimed in claim 10, wherein the radio resources to be allocated includes radio sub channels, wherein the Network Control and Management System controls the allocation of radio resources based upon:
a detection that a given set of sub channels is used by one of the Base Station Entities, and
an issuing towards further Base Station Entities in the Base Station Cluster to transmit over a set of sub channels given to one Base Station Entity the given set of sub channels with a level maintaining a controlled level of Co-Channel Interference.

16. The Network Control and Management System as claimed in claim 10, wherein the Network Control and Management System
issues towards the Base Station Entities a third message, including commands to align the permutation zones of different Base Station Entities in the Base Station Cluster and to determine the radio resources to be used within each permutation zone by the Base Station Entities in the Base Station Cluster.

17. The Network Control and Management System as claimed in claim 16, wherein the Network Control and Management System receives on a periodic basis the second message returned from the Base Station Entities.

18. A communication network, comprising:
a Base Station Cluster;
a plurality of Base Station Entities;
permutation zones allocated to the Base Station Entities, a Permutation Zone being a number of contiguous Orthogonal Frequency-Division Multiple Access (OFDMA) symbols in a downlink or uplink that use the same permutation or mapping sequence between sub-channels and sub-carriers, the permutation zones being aligned when all the base station entities of all Base Station clusters are synchronized in time and frequency so that a starting time of each permutation zone is the same for all Base Station (BS) entities of all the base station clusters controlled by a Radio Resource Control (RRC) entity within the network control and management system, wherein aligning the permutation zones reduces Co-Channel Interference and mobile-to-mobile interference;

radio resources allocated to the Base Station Entities;

a Network Control and Management System to control the allocation of the permutation zones and the radio resources to the Base Station Entities in the Base Station Cluster by aligning the permutation zones of different Base Station Entities in Base Station Cluster and by determining the radio resources to be used within each permutation zone by the Base Station Entities in the Base Station Cluster; and wherein the Network Control and Management System:

issues towards the Base Station Entities a first message requesting information on the radio resources available including specific information items for each permutation zone, and receives a second message returned from the Base Station Entities, including the information requested in the first message.

19. The communication network as claimed in claim 18, wherein the allocated radio resources have radio sub channels, wherein the Network Control and Management System controls the allocation of the radio resources to the Base Station Entities based upon allocating different sub channels within each permutation zone, wherein the Network Control and Management System detects a use of a set of sub channels by one of the Base Station Entities, and wherein the Network Control and Management issues towards other Base Station Entities in the Base Station Cluster command signals not to use a specified set of sub channels.

20. The communication network as claimed in claim 19, wherein the Network Control and Management System issues towards the Base Station Entities a third message, including commands to align the permutation zones of different Base Station Entities in the Base Station Cluster and to determine the radio resources to be used within each permutation zone by the Base Station Entities in the Base Station Cluster, and wherein the Network Control and Management System receives on a periodic basis the second message returned from the Base Station Entities.

* * * * *